(12) United States Patent
Lowe

(10) Patent No.: US 8,732,016 B2
(45) Date of Patent: May 20, 2014

(54) SYSTEM, METHODS, AND APPARATUS FOR INTERACTIVE ADVERTISING

(75) Inventor: John Lowe, Alberta (CA)

(73) Assignee: Poynt Inc., Richmond Hill, Ontario (CA)

( * ) Notice: Subject to any disclaimer, the term of this patent is extended or adjusted under 35 U.S.C. 154(b) by 1115 days.

(21) Appl. No.: 11/857,328

(22) Filed: Sep. 18, 2007

(65) Prior Publication Data

US 2008/0071620 A1    Mar. 20, 2008

Related U.S. Application Data

(60) Provisional application No. 60/826,077, filed on Sep. 18, 2006.

(51) Int. Cl.
*G06F 17/30*    (2006.01)

(52) U.S. Cl.
USPC ............... 705/14.55; 705/14.57; 705/14.58; 705/26.61

(58) Field of Classification Search
USPC ............... 705/14.55, 14.57, 14.58, 26.61
See application file for complete search history.

(56) References Cited

U.S. PATENT DOCUMENTS

| | | | |
|---|---|---|---|
| 6,587,835 B1 * | 7/2003 | Treyz et al. ............... | 705/14.64 |
| 6,651,053 B1 | 11/2003 | Rothschild | |
| 7,062,530 B2 * | 6/2006 | Scheinkman ............... | 709/203 |
| 7,792,709 B1 * | 9/2010 | Trandal et al. ............... | 705/26.1 |
| 2002/0087408 A1 * | 7/2002 | Burnett ............... | 705/14 |
| 2002/0163546 A1 * | 11/2002 | Gallo ............... | 345/848 |
| 2002/0188499 A1 | 12/2002 | Jenkins et al. | |
| 2005/0065916 A1 | 3/2005 | Ge et al. | |
| 2006/0150119 A1 * | 7/2006 | Chesnais et al. ............... | 715/810 |

OTHER PUBLICATIONS

International Search Report and the Written Opinion dated Feb. 21, 2007 for PCT/US07/78797.

* cited by examiner

*Primary Examiner* — Naresh Vig
(74) *Attorney, Agent, or Firm* — Sunstein Kann Murphy & Timbers LLP

(57) ABSTRACT

The present invention relates to a system and methodology for searching and presenting merchant and advertised information to a user over a wide area network such as the Internet. The system and method actively links manufacturer and merchant information within a search query so as to enable a user to conduct more efficient searching when seeking products or services in a proximity or geographical area. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

23 Claims, 13 Drawing Sheets

SYSTEM, METHODS, AND APPARATUS FOR INTERACTIVE ADVERTISING

CROSS REFERENCE TO RELATED APPLICATIONS

The present application claims priority to U.S. Provisional Application No. 60/826,077, filed Sep. 18, 2006, entitled "Interactive Advertising System", the entire contents of which are hereby incorporated by reference.

FIELD OF THE INVENTION

The present invention relates to a system and methodology for searching and presenting merchant and advertised information to a user over a wide area network such as the Internet. The system and method actively links manufacturer and merchant information within a search query so as to enable a user to conduct more efficient searching when seeking products or services in a geographical area.

BACKGROUND OF THE INVENTION

Utilizing the Internet as a marketing medium has rapidly evolved and has steadily become accepted by manufacturers and merchants. Internet advertising is now a multi-faceted activity that continues to progress towards a comprehensive mirroring of the multitude of traditional promotional, marketing and advertising channels that have been used by manufacturers and merchants.

The Internet delivers a wide variety of content formats on a number of protocol based platforms and is used in all facets of corporate, product and service marketing. Such protocols include but are not limited to "instant messaging" protocols and browser based protocols.

An Internet marketing area that is of particular interest and relevance to merchants and manufacturers in promoting their goods and services is the Internet search. The Internet search, as a marketing service, is based on manufacturers and merchants paying for listings or paying for an improved position in a results page of listings that are given to Internet Search Engine users. Search engines that search the entire Internet for results ('whole internet search engines') do not require manufacturers and merchants to pay for appearing in the results of a search. These search engines utilize algorithms to estimate the relevance between the search term entered by the user ('keyword') and any Internet content. The search results are delivered as a list of links to Internet pages, based on the ranking that each web page is given by the algorithm. Manufacturers and merchants typically have a web page, in order to appear in the search engine results.

Some manufacturers and merchants, who have web sites, engage the services of search engine marketing firms, who use knowledge of search engine algorithms to improve their clients' search engine ranking, with the intention of placing the manufacturer's or merchant's web page link closer to or at the top of the search results.

As a compliment to or alternative to whole internet search engines, marketing firms are able to place 'sponsored' or 'featured' placement service provided by whole internet search engines. These services allow manufacturers and merchants to purchase positions in the user's search results. These 'featured' or 'sponsored' listings are typically delivered in a 'sponsored link' or 'featured listing' portion of the search results page (typically placed at the top, bottom or right hand side of the search results page). These placements are made through algorithms that relate the user's keyword to the areas that are relevant to the manufacturer or merchant. Manufacturers and merchants may also purchase placements in searches for particular keywords.

Not all search engine marketing services are provided by whole internet search engines. Many search engine operators are selling a position in an internal database and delivering the results through the Internet. These search engines typically target a particular section of Internet users or users looking for a particular product or service ('vertical search engines').

Not all search engines that are not whole internet search engines are vertical search engines. The leading global search engines have released localized versions of their service, with algorithms that are focused on delivering search results based on proximity to the user. These local search engines use some form of geographic locator such as a map, zip code, latitude/longitude position or other geocode identifier to identify a user's location and then deliver information that identifies a group of merchants that are located within the selected local area. Typically, search results are delivered through plotting on a map interface, with associated links and 'sponsored' links listed above, below or beside the map graphic. These search engines compete with search engines services that are provided by Local Directory Services operators. Typically, local directory services search engine services deliver results through a combination of 'sponsored' link placements and general results for the market area. Some directory service operators' search engines provide users with a proximity search feature, which delivers results ranked on proximity to the user's inputted location.

Today, the Internet search generally only allows a user to search based on a keyword or a proximity axis. However, an Internet search usually does not allow a user to approach a search from multiple perspectives, while maintaining information across numerous search axes.

It is known and understood that consumers approach a purchase decision from a variety of perspectives. As a result, there has been need for the consumer/user:

to approach a purchase decision from a wide number of decision axes
to gather all or some of the available Internet content
to gather information in a variety of content formats
to gather all the information in a single Internet activity session.

An example of an earlier technology to partially solve the above needs is described in Applicant's co-pending application (U.S. patent application 60/667,915 and corresponding PCT application (both incorporated herein by reference)). Applicant's co-pending application describes a system and method enabling the presentation of goods and services data (hereinafter "merchant information") to a user where the merchant information is ordered in relevance based on the location of the user. In this system, a user seeking merchant information queries the system to locate relevant merchant information based on a user location determined either by the system or entered by the user. Upon being presented with a list of relevant merchant information, the user may then obtain additional information with respect to that merchant including a URL link to the merchant's website and/or driving directions, as may be requested.

While Applicant's co-pending system is highly effective in locating relevant merchant information, the presentation of the information, as with whole internet search engines, presents only a limited amount of information on which a user will base a decision to choose one path over another to obtain further information. In particular, Applicant's co-pending system does not readily enable a user to access relevant manufacturer information that may assist the user in locating the most relevant merchant for supplying a particular product or service.

For example, if a user has prior knowledge that they want information to direct them to the nearest shop selling televisions, the user may search for a known shop name referred to generically within this description as "Television Store". "Television Store" may have numerous locations in a geographical area and the user may merely be seeking the nearest "Television Store" location. With the co-pending system, the user would search for "Television Store" and the system would return a list of the nearest "Television Store" locations based on their distances to the user. To a certain level, this can be extremely valuable information to a user and can greatly improve the efficiency of a search compared to previous technologies.

At another level, and in another search, the user may have less knowledge about the specific store they want to find and instead is seeking information about televisions in general, hoping to locate a number of stores that sell televisions. In this situation, the Applicant's co-pending system will present a number of different stores by name (ordered on the basis of proximity). By drilling down through the list of stores, with possible diversions to a specific store's listed website, the user may make a decision as to what store appears to be the most attractive to visit.

However, this searching methodology is somewhat inefficient for certain searches in that the quantity of information visually or graphically displayed to the user is limited and is generally presented in a non-graphical format. That is, at the primary search level, the user is presented only with text information relating distances, store names and addresses and it is only by actively selecting a listed store that additional information may be presented by opening a separate window for a separate website. Thus, pursuing a particular path may yield highly irrelevant information as the quantity of relevant information presented that suggests to a user to pursue one path is limited. That is, the user's selection of a particular path may be based solely on proximity leading to search results producing non-useful results if the nearest stores do not carry the desired products. Alternatively, a user's selection of a particular path may be based solely on a user's prior knowledge of known stores such that equally relevant paths are not pursued. Still further, opening and closing numerous websites is both time-consuming and confusing to a user and often leads to diversions that causes a user to give up on the initial search purpose.

Accordingly, there has been a need for a system that overcomes the preceding problems and provides more efficient and dynamic searching functions to users where the likelihood and speed by which a user obtains relevant information is increased. More specifically, there has been a need for a system that actively links the merchant data (i.e. the location of a merchant) with manufacturer data (i.e. the types of products that are sold by that merchant) wherein a user's interaction with one component of the system dynamically updates another component of the system with relevant information.

SUMMARY OF THE INVENTION

In accordance with the invention, an interactive advertising system deployed over a wide area network, such as the Internet is provided, the interactive advertising system comprising: an input module (IM) enabling a user to enter query commands of a query into the interactive advertising system; a results module (RM) for displaying type 1 query results from the query; an activity module (AM) for displaying type 2 query results from the query; a processing module (PM) for receiving the query commands, processing the query commands to produce type 1 and type 2 query results and providing the type 1 and type 2 query results to the results and activity modules respectively; wherein the AM further enables user interaction with the AM as AM commands such that the PM upon receiving AM commands interprets and updates the type 1 results.

In various embodiments, additional functionality may be incorporated into the interactive advertising system including any one of or operative combination of the following functionalities:

wherein the PM upon receiving AM commands interprets and updates the type 2 results; wherein the PM determines type 1 results on the basis of user proximity; wherein type 1 results include both advertiser and non-advertiser merchants ranked in order of proximity to the user;

wherein type 1 results includes distances of each advertiser and non-advertisers merchant to the user;

wherein type 2 results include any one of or a combination of information relating to merchant brand names, merchant product lines, merchant products, merchant pricing, merchant stock data and graphical maps;

wherein the PM receives and interprets data from the instant messaging and browser protocols in response to user input and interacts with an advertiser's database to obtain and display type 1 and type 2 results in the RM and AM respectively;

wherein the IM and RM and AM are based on any one of or a combination of an instant messaging protocol, a browser protocol, a short messaging service (SMS) protocol and multiple messaging service (MMS) protocol;

wherein the PM is operatively connected to at least one advertiser's database, or alternatively advertising information is stored in an associated database;

wherein the PM requests and receives information from the advertiser's database based on AM commands and the PM concurrently updates the type 1 results; wherein the AM enables a user to drill down through a hierarchy of brand and product information and that at each level in the hierarchy the PM updates the RM;

wherein at a first level, the RM displays brand names from different advertisers; wherein the relative prominence of each advertiser's brand name may be determined by an online bidding process managed by the PM;

wherein the AM may enable a user to drill down through a hierarchy of product information and that at each level in the hierarchy the PM updates the RM with respect to those merchants having corresponding brands, product lines, products and stock;

wherein an advertiser may update their advertising information within their database without interaction with the PM;

wherein a user's interaction with the AM excludes merchants not carrying the selected advertiser information from being displayed in the RM; and, wherein the PM orders type 1 results on the basis of user selection of any one of or a combination of ranking-by-price, ranking-by-proximity or ranking by price and proximity.

In a further embodiment, the invention provides an interactive advertising system comprising: a processing module for operative interaction with a instant messaging protocol and an Internet browser protocol, the processing module enabling a user to selectively interact with each protocol during an instant messaging session wherein the instant messaging session allows a user to query and obtain product information based on proximity to the user and the query thereby creates and manages a corresponding Internet browser session displaying any one of or a combination of brand, product line, and product information relevant to the query. The processor module may further enable a user's interaction with the Internet browser session to update the instant messaging session.

One embodiment provides for a method that configures a computing device to receive an input from a user requesting information about a product or service within a proximity or geographical area. In this embodiment the computing device is configured to provide an output in the form of a list of one or more merchants that provide the product or service within the proximity. The computing device then provides a second output that comprises one or more brand names under which the product or service is available within that proximity. In this embodiment these outputs are simultaneously displayed to the user on an instant messenger interface.

In another embodiment, the system provides a method of enabling a user to interact with an interactive advertising system comprising the steps of:
  a) providing an instant messaging session enabling a user to enter query commands of a query into an instant messaging session and for displaying query results from the query;
  b) providing a simultaneous browser session for displaying brand and product information relevant to the query; and,
  c) updating each of the instant messaging session and browser session based on a user's selective interaction with each of the instant messaging and browser sessions.

In yet further embodiments, additional steps may be incorporated into the interactive advertising system including any one of or operative combination of the following steps: wherein step a) includes displaying results from the query on the basis of user proximity; wherein step a) includes displaying advertiser and non-advertiser merchants ranked in order of proximity to the user; and,
wherein step b) includes displaying any one of or a combination of merchant brand names, merchant product lines, merchant products, merchant pricing, merchant stock data and graphical maps.

BRIEF DESCRIPTION OF THE DRAWINGS

Various embodiments of the present invention taught herein are illustrated by way of example, and not by way of limitation, in the figures of the accompanying drawings, in which.

Figure 1:
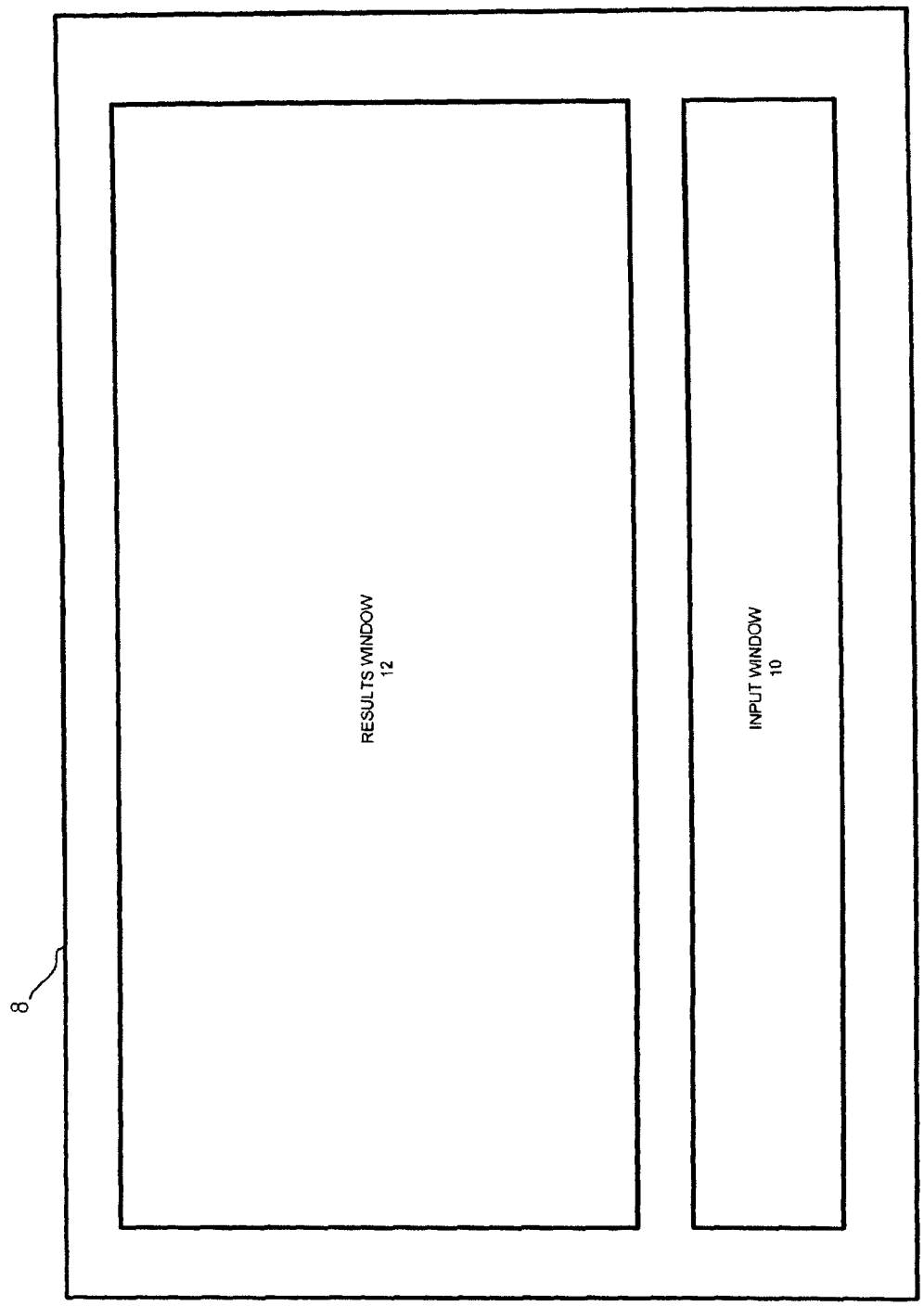
FIG. 1 is a typical search and results display in accordance with the prior art.
Figure 2:
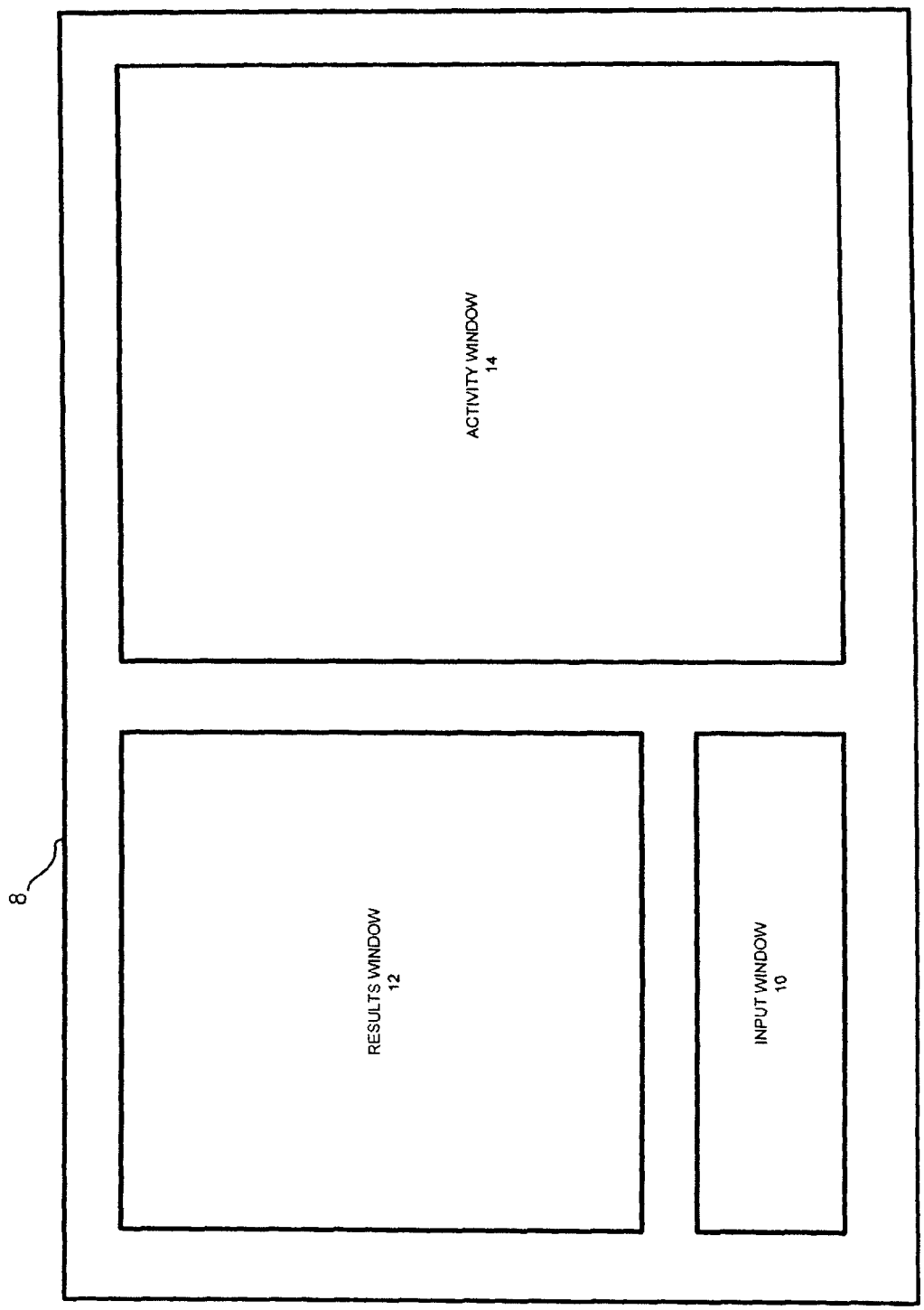
FIG. 2 is a typical display showing an input window, results window and activity display in accordance with the invention.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

As shown in FIG. 1 and in accordance with the prior art, a search and display system on a computer screen 8 is shown as known within "instant messaging" sessions on the Internet. The typical display of the prior art includes an input window (IW) 10 and a results window (RW) 12 allowing a user, when conducting a search, to enter search data in the input window 10 wherein the results of the search are displayed in the results window 12. Results displayed in the results window are referred to herein as type 1 results.

As shown in FIGS. 2-10A/B/C, in accordance with the invention, a further activity window (AW) 14 is included for displaying associated advertiser information relevant to the search results displayed in the results window 12. The information displayed within the RW may be text, graphics, sound, and/or video and may include company logos, trademarks, maps and other promotional information and is generally referred to herein as type 2 results. As described herein, the RW allows a user to interact with the RW wherein the results of the user's interaction with the RW will cause the type 1 results displayed in the RW to be updated. Similarly, a user's interaction with the RW will cause the type 2 results displayed in the AW to be updated.

In one embodiment, the invention provides an interactive advertising system comprising: a processing module for operative interaction with a instant messaging protocol and an Internet browser protocol, the processing module enabling a user to selectively interact with each protocol during an instant messaging session wherein the instant messaging session allows a user to query and obtain product information based on proximity to the user and the query thereby creates and manages a corresponding Internet browser session displaying any one of or a combination of brand, product line, and product information relevant to the query. The processor module may further enable a user's interaction with the Internet browser session to update the instant messaging session. Further, as is known in the art, this browser session may include a session on a Wireless Application Protocol (WAP) browser on a hand-held electronic device such as a cell phone or PDA.

One feature of various embodiments is that they provide a method that configures a computing device to receive an input from a user requesting information about a product or service within a proximity or geographical area. In this embodiment the computing device is configured to provide an output in the form of a list of one or more merchants that provide the product or service within the proximity. The computing device then provides a second output that comprises one or more brand names under which the product or service is available within that proximity. In this embodiment these outputs are simultaneously displayed to the user on an instant messenger interface. Alternatively, this functionality may be displayed on two or more areas drawn on a web browser interface.

Another feature of various embodiments, is that user interaction is with an instant messenger and displays are done within an instant messaging protocol. In some of these embodiments, the instant messenger is a software module embedded into a web browser. In other embodiments, the instant messenger is a program with an interface distinct of a web browser.

Figure 10A:
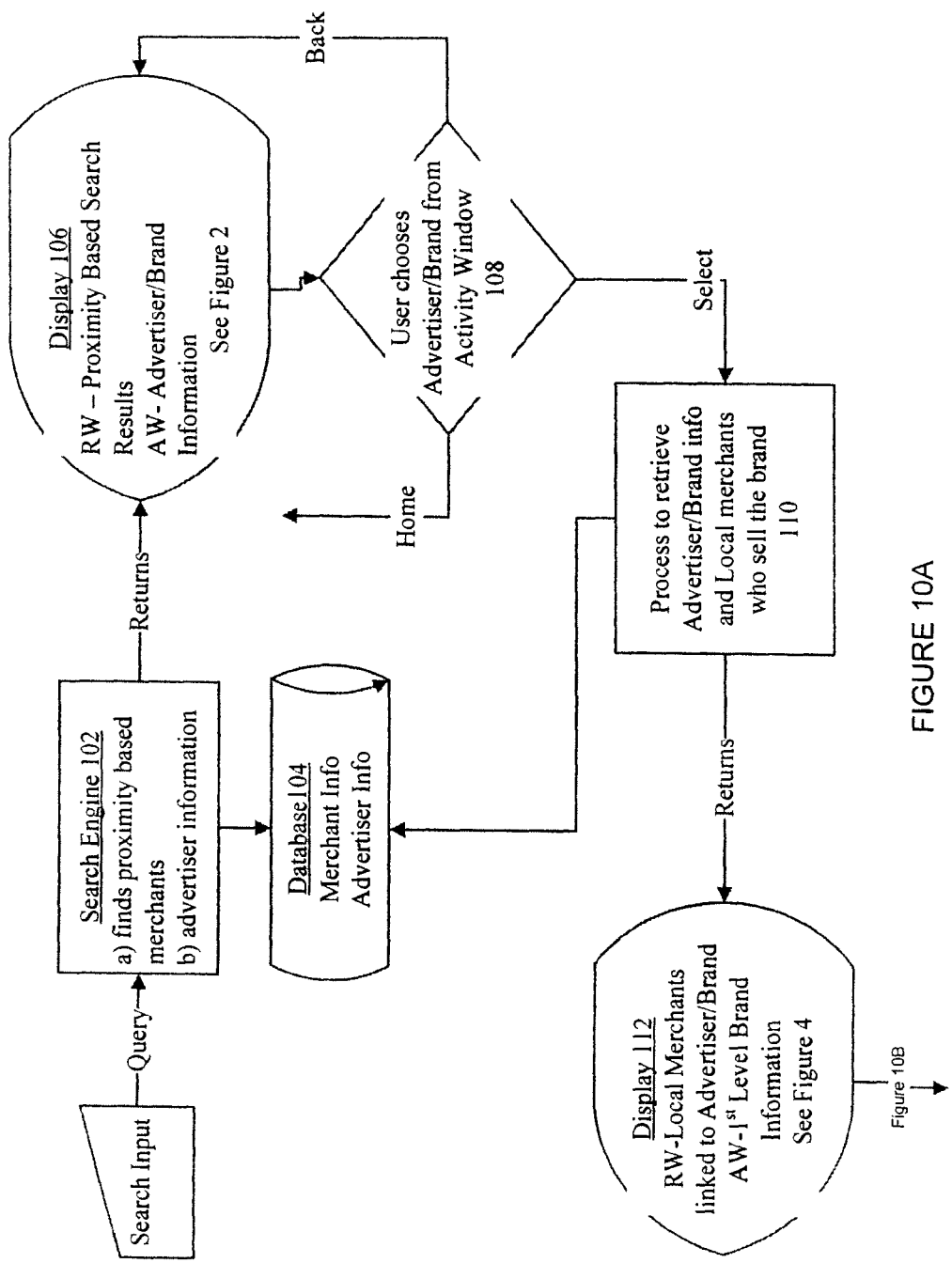
FIGS. 10A, 10B and 10C are flowcharts showing a method of the invention in accordance with one embodiment; and, FIG. 11 is a schematic diagram showing the interaction between an Instant messaging session, a browser session, a processing module, one or more advertiser databases and a user in accordance with one embodiment of the invention.
Figure 10B:
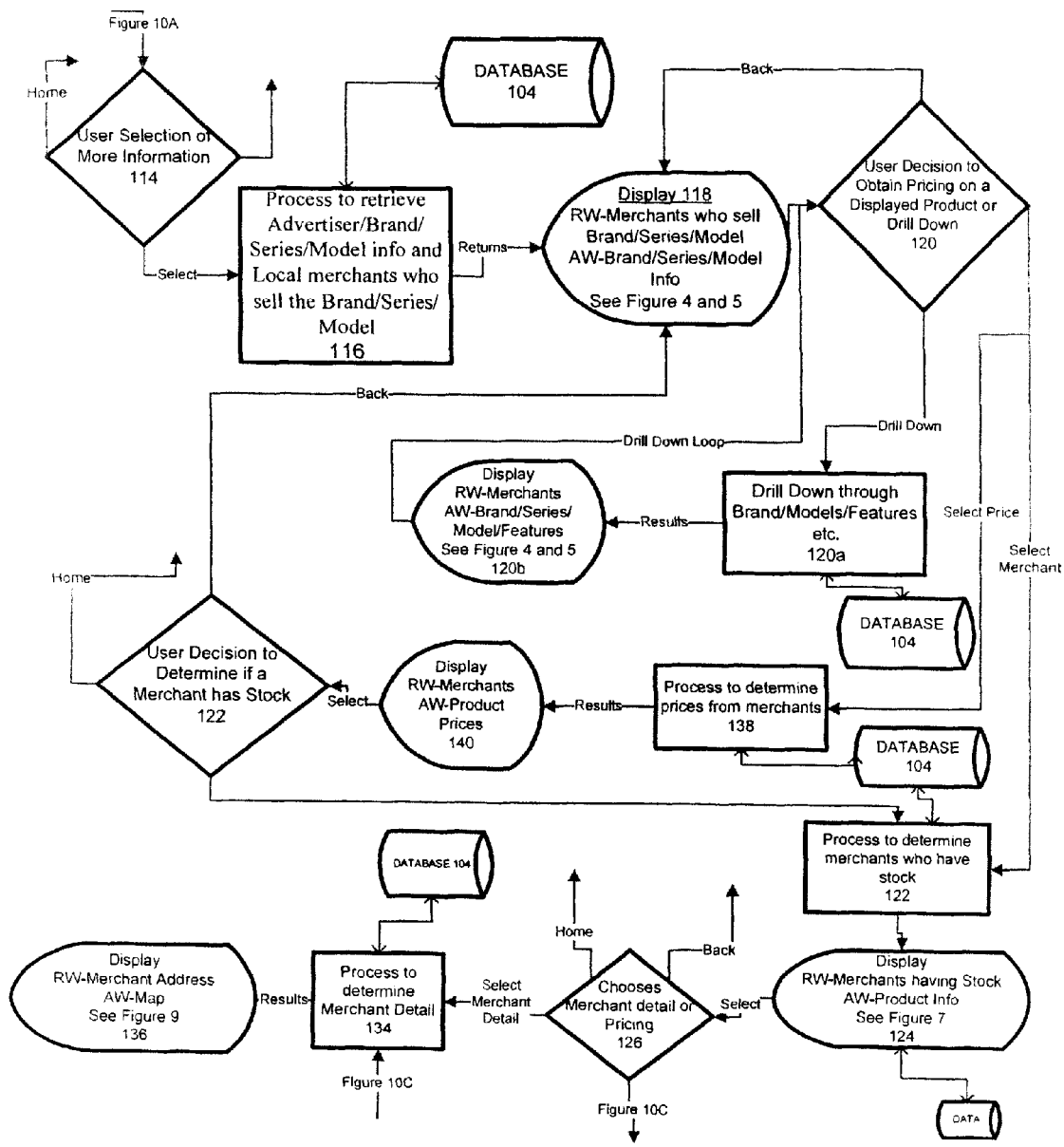
Figure 10C:
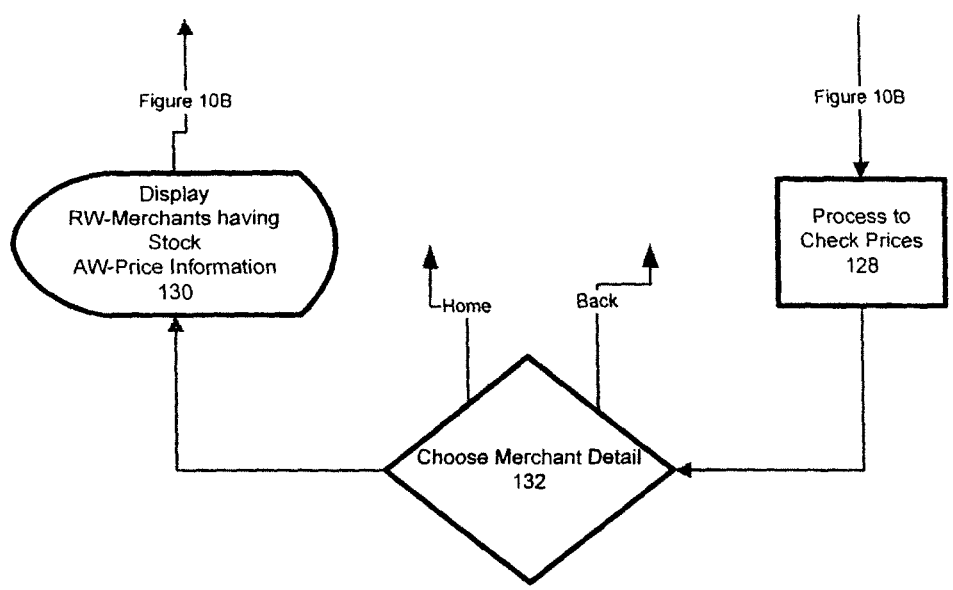

The functionality of the system is described by a representative search example which is illustrated in FIGS. 10A-10C.

A user wishing to purchase a television accesses the system and enters a search input in the form of query criteria (Box 100) into input window 10 (illustrated in previous Figures). The query criteria (for example, find "television") are processed by a search engine 102 accessing a database 104 interacting with both merchant and advertiser records. The search engine 102 returns and displays (Box 106) a) proximity based search results for display in the results window 12 and b) advertiser information for display in the activity window 14.

Figure 3:
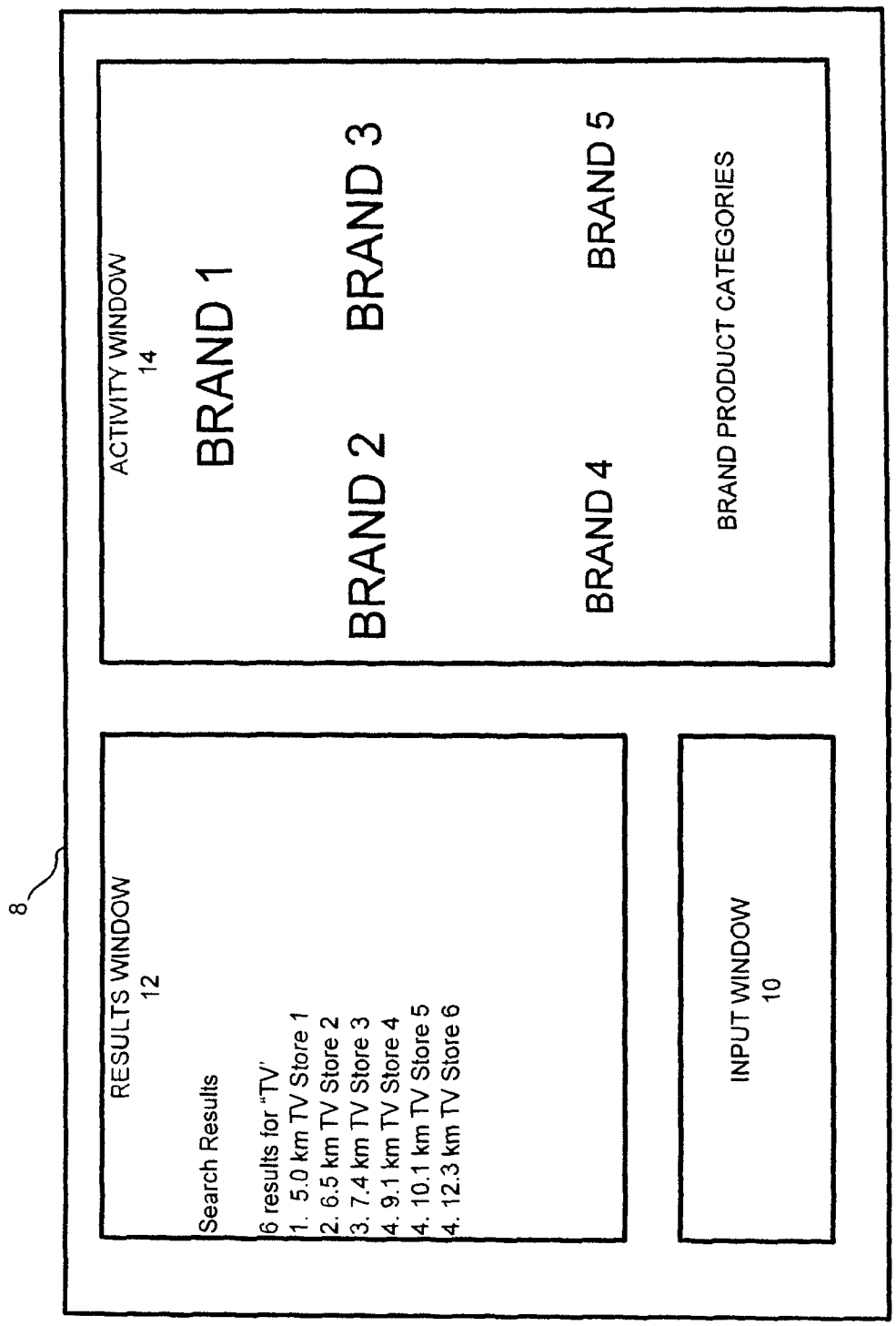
FIG. 3 is a typical display showing initial search results and linked brand information in the activity window in accordance with one embodiment of the invention.

As shown in FIG. 3, the proximity based search results may list, for example, 6 stores selling televisions. The activity window, based on the search criteria and search engine algorithm, displays various advertised brands of products that are relevant. The relative size and prominence of various brand names that may be displayed in the AW 14 will generally be determined on the basis of paid advertising, wherein size and position within the AW 14 can be bought based on various criteria. In addition, other information or pathways may be available by displaying brand product categories. In our television example, such brand product categories may be categories such as "LCD", "Plasma", "Projection" or "Accessories".

At decision point 108 (FIG. 10A), a user may then select (click) a particular Brand shown in the AW 14. If, for example, Brand 1 is selected, the RW 12 (Box 112) is updated by process 110 to list those merchants selling Brand 1 as shown in FIGS. 4 and 10A.

At decision point 114 (FIG. 10B), by selecting Brand 1, additional levels of brand product lines, brand products and brand specifications and/or information may also be followed by process 116 as shown in FIGS. 4, 5, 6 and 10B.

Figure 4:
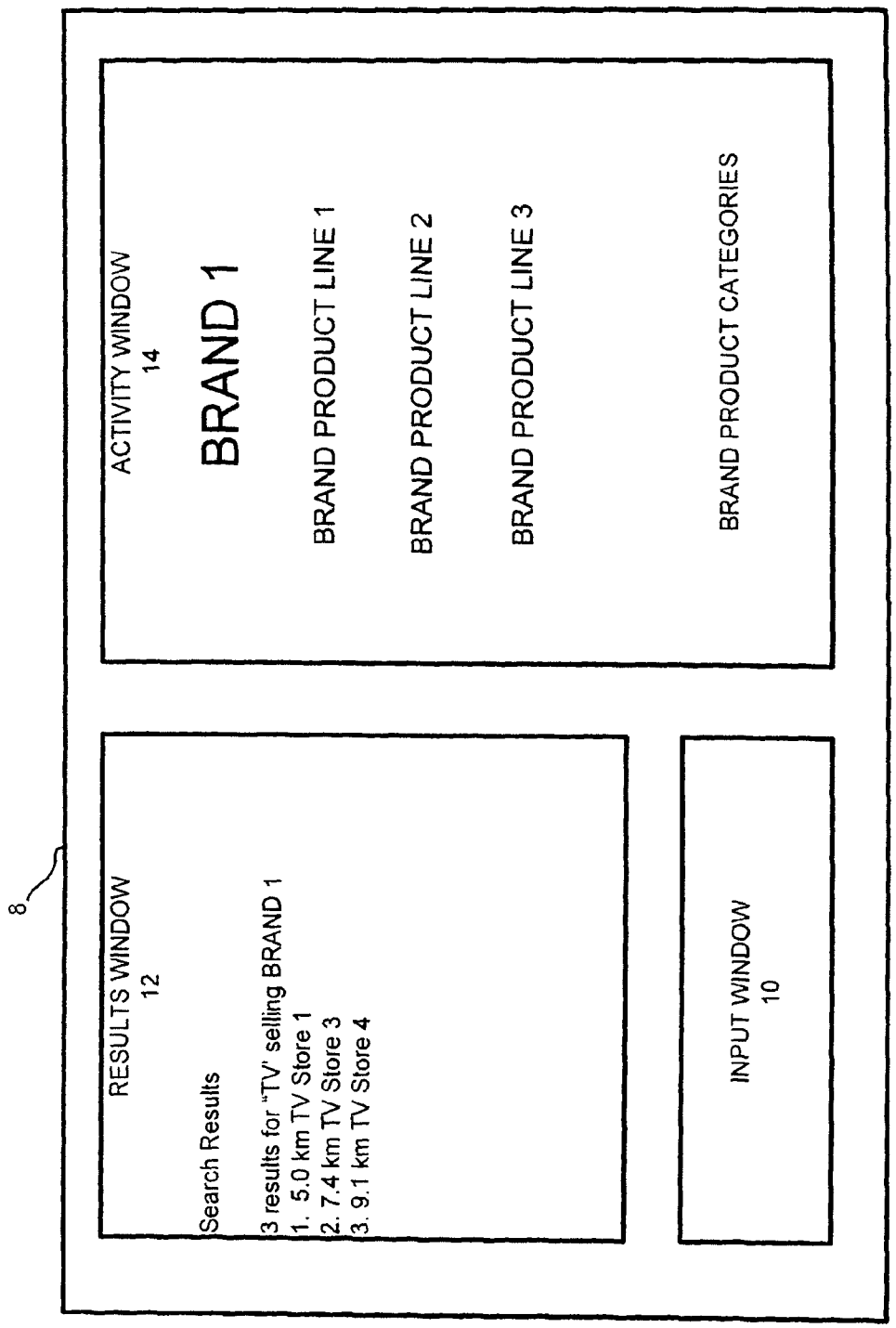
FIG. 4 is a typical display showing search results and linked brand product line information in the activity window in accordance with one embodiment of the invention.
Figure 5:
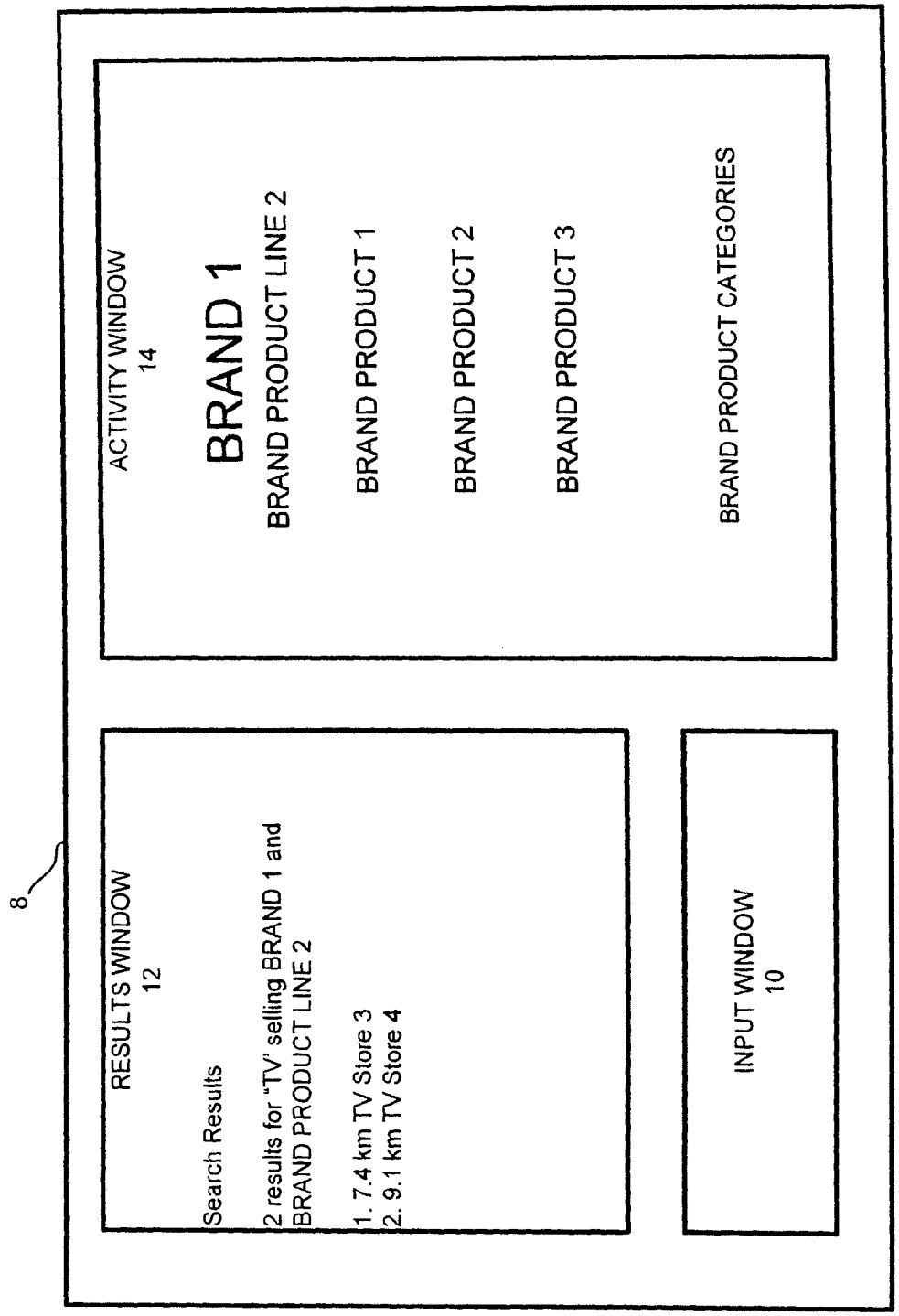
FIG. 5 is a typical display showing search results and linked brand product information in the activity window in accordance with one embodiment of the invention.
Figure 6:
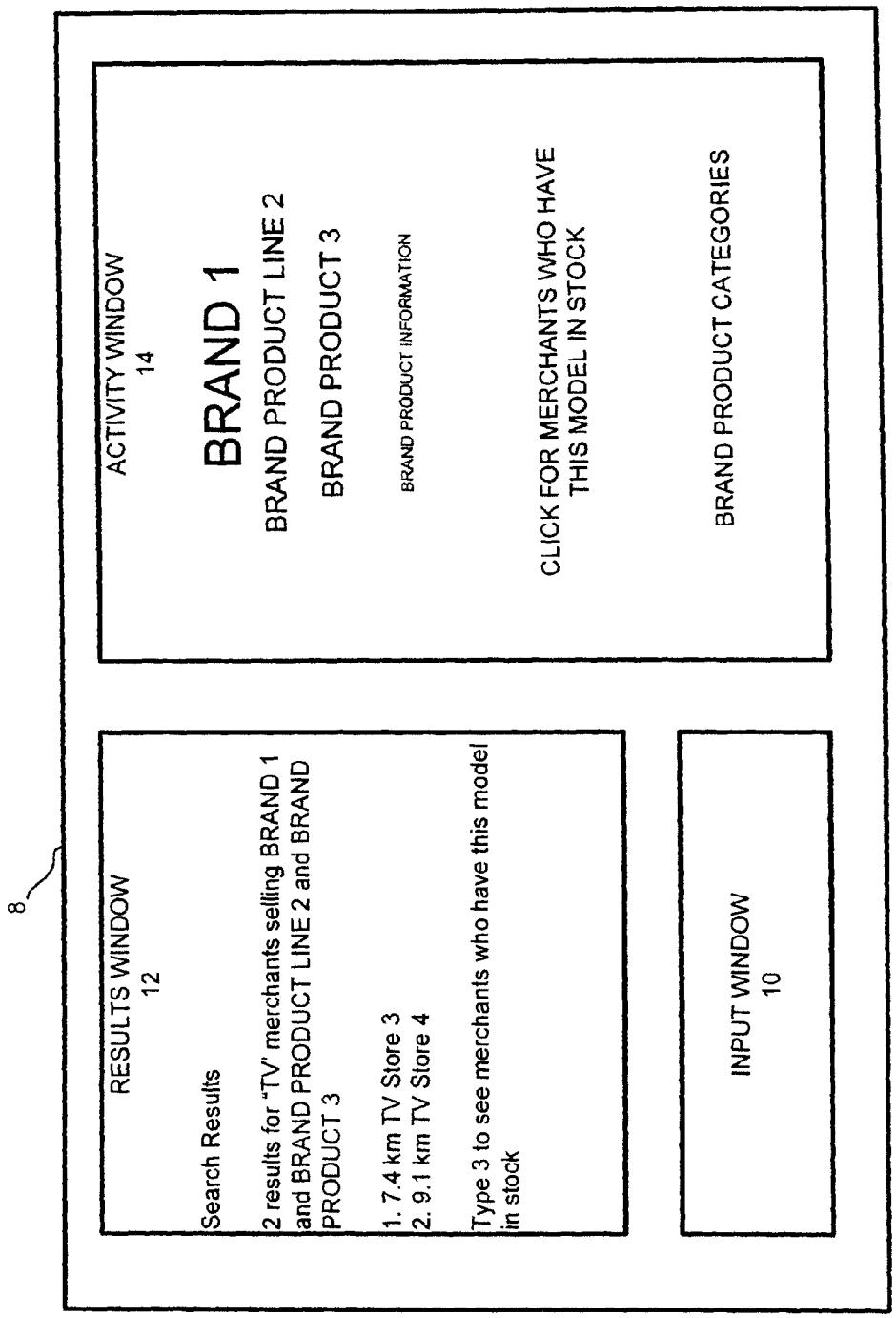
FIG. 6 is a typical display showing search results, linked brand product information and a link to determine merchant stock in the activity window in accordance with one embodiment of the invention.

In FIG. 4, Brand 1 was selected, resulting in the RW 12 being updated to show three stores carrying Brand 1. In FIG. 5, Brand Product Line 2 was selected, resulting in the RW 12 being updated to show 2 stores carrying Brand Product Line 2. In FIG. 6, Brand Product 3 from Brand Product Line 2 was selected, resulting in the RW 12 being updated to show the same two stores carrying Brand Product 3. The drill down loop (Boxes 120, 120*a*, 120*b*) further allows a user to navigate to a specific Brand Product.

Figure 7:
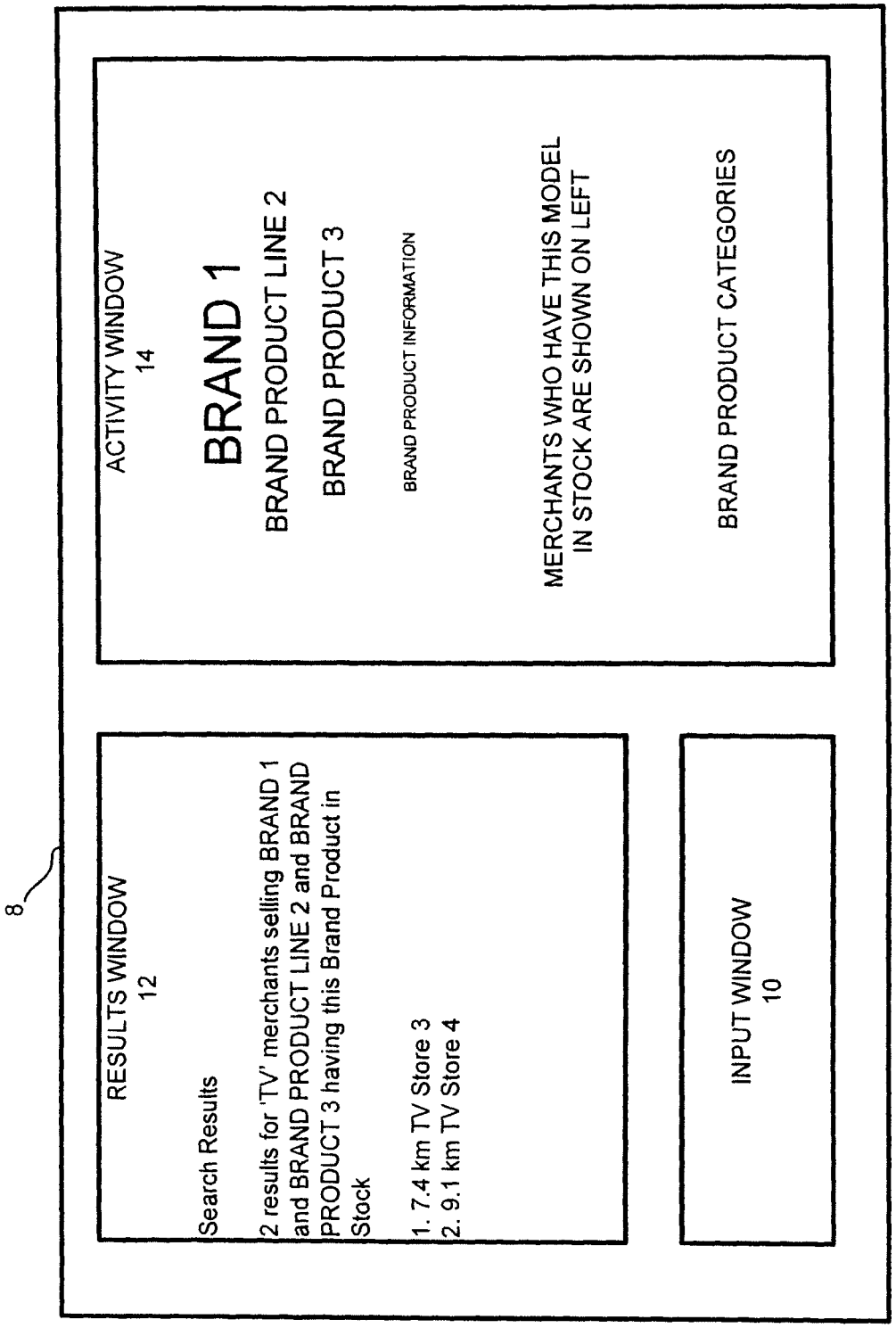
FIG. 7 is a typical display showing search results showing merchants having stock in the results window and corresponding linked brand product information in the activity window in accordance with one embodiment of the invention.

When a specific Brand Product is displayed (Box 120), the user may select to display stock and price information with respect to that Product. For example, as shown in FIG. 6, the user, having identified that two stores carry the desired product has the option of determining if the product is in stock in those stores. Those stores having stock are displayed in the RW 12 (Box 124) as shown in FIGS. 7 and 10B as determined by process 122.

Figure 8:
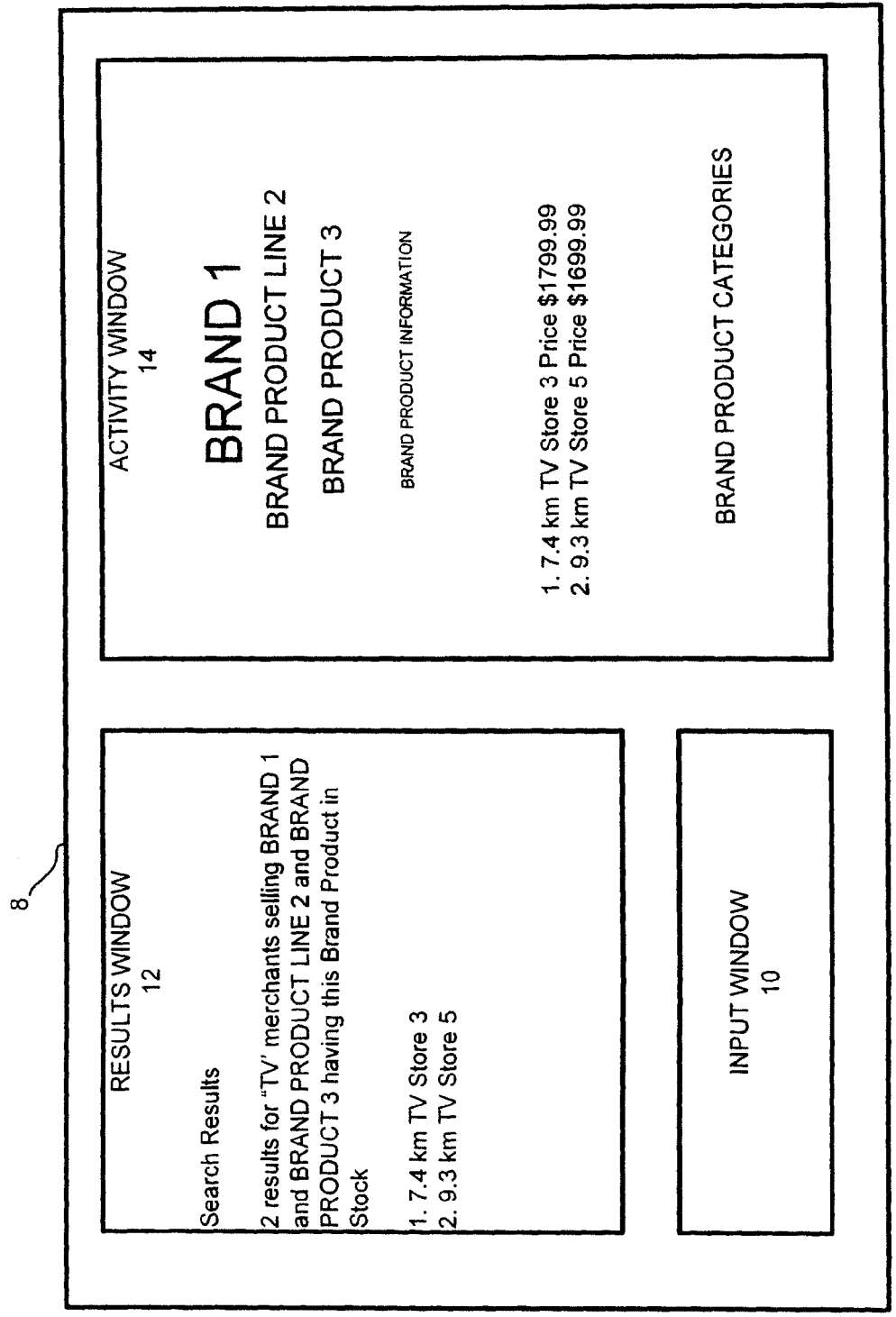
FIG. 8 is a typical display showing search results showing merchants having stock in the results window and corresponding linked brand product information and pricing information in the activity window in accordance with one embodiment of the invention.
Figure 9:
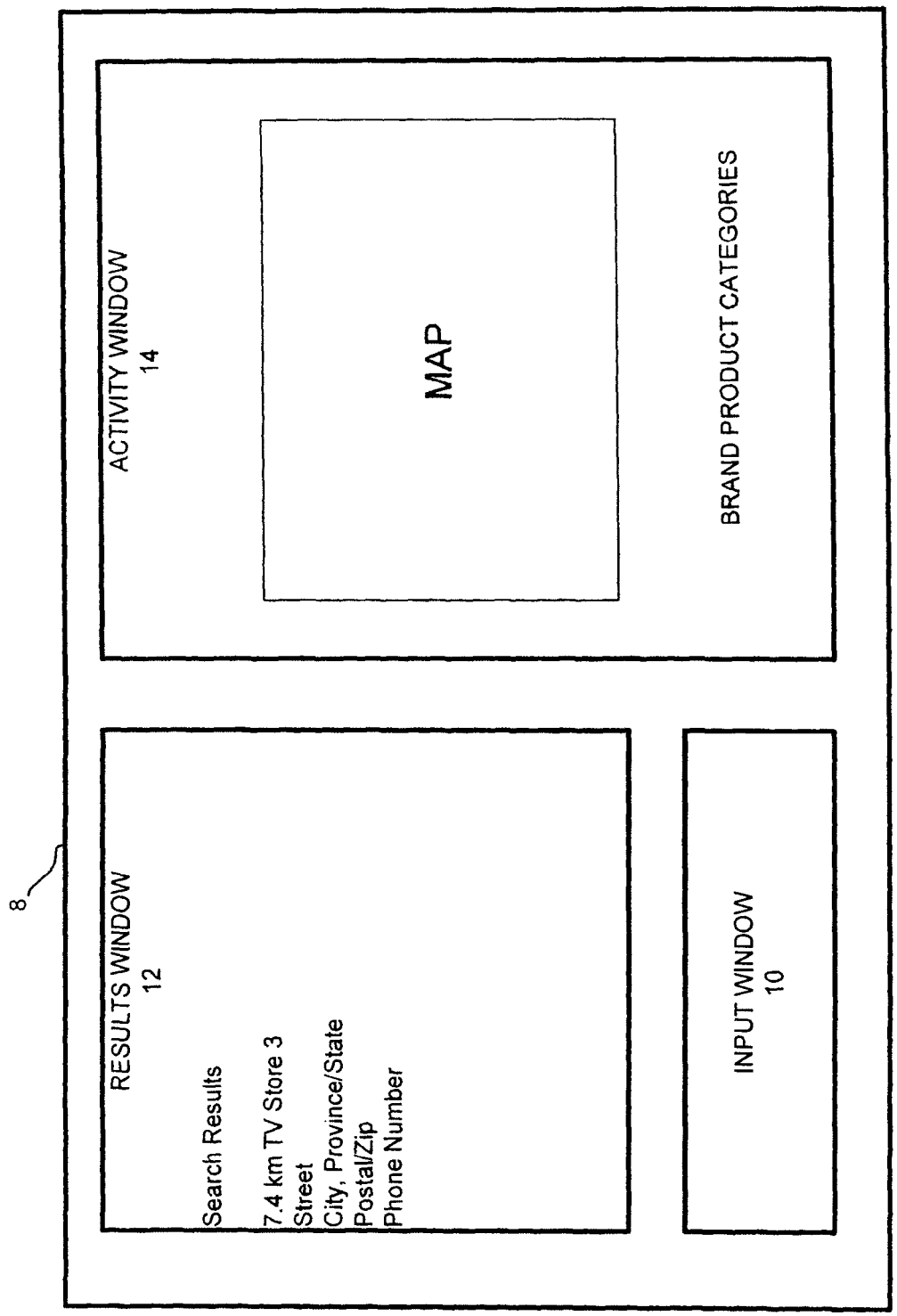
FIG. 9 is a typical display showing specific merchant information in the results window and a map to the merchant in the activity window in accordance with one embodiment of the invention.

The user may then choose to obtain pricing information (Box 126) on the product selected from the merchants indicated as having stock as shown in FIG. 8 and FIG. 10B at process 128. Pricing Information is displayed (Box 130) for merchants indicated as having stock. The user may then select a particular merchant (Box 132) to enter a process to obtain more detailed information about a merchant (Box 134) which then displays merchant address/contact information in the RW and map information in the AW (Box 136). In some embodiments the system is additionally configured to allow a user to purchase a desired product through the interface.

Alternatively, at Box 120, the user may select pricing information on a product through process 138 which displays merchant prices (Box 140) for the selected product. Following this path, a user may decide (Box 142) to determine if a merchant has the selected product in stock by process 122. Thereafter, a user may progress to displaying detailed merchant information as described above.

In various embodiments, the system is deployed as a combined instant messaging and browser session wherein the results window and input window are enabled using an instant messaging protocol and the activity window is enabled using an internet browser protocol enabling the user to interact with both protocols on one screen.

Figure 11:
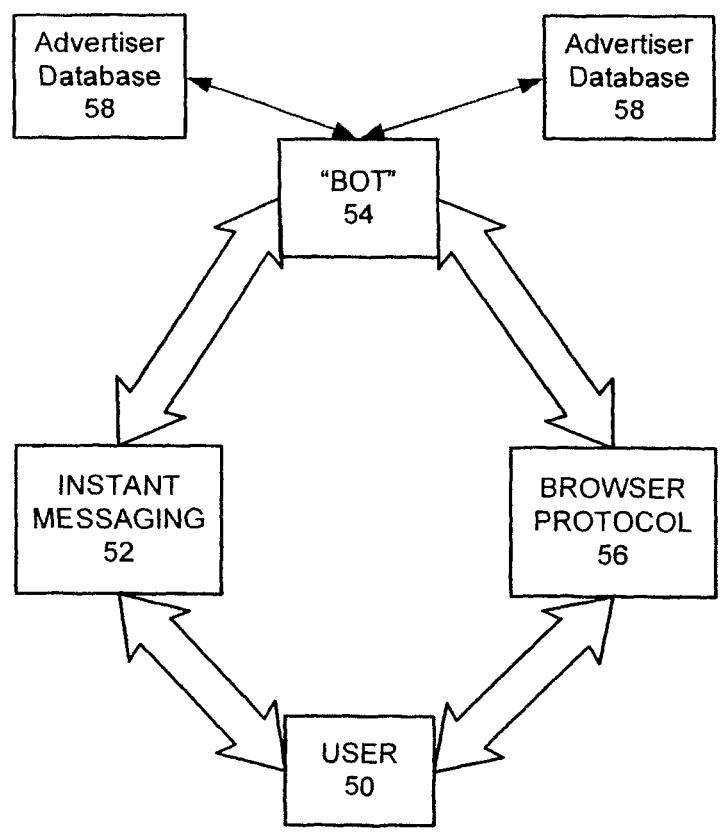

More specifically, a user 50 in initiating a search, as described above and shown in FIG. 11, will initially interact with the instant messaging protocol 52 to access a "bot" identity (for example, imlocal@msn.com (an "MSN" contact identity)) through the instant messaging protocol. The bot identity is a software or processor module having algorithms for directing a user's interaction with the instant messaging protocol to an intended or directed result. In Internet programming Bots are well known in the art and the specific programming details are omitted here for convenience. For example, a user in establishing a "conversation" with the bot may be directed to a result as shown in the following representative conversation after the user has contacted the bot:

Bot: Welcome! What are you looking for today?
User: Televisions
Bot: Where are you?
User: Calgary.

Bot: What is your postal code?
User: xyz
Bot: Here is a list of stores that sell televisions close to you. The screen on the right allows you to obtain information about different brands, different product lines and products. Select any brand for more information.
User: (Selects Brand X from Activity Window)
Bot: These are the stores that sell Brand X. You can obtain product line, product information, product pricing and availability from the screen on the right.
User: (Drills down to Product X by browser interaction within Activity Window and Results Window is con-currently updated based on the user interaction)
Bot: Would you like to obtain pricing information for this product from the listed stores?
User: Yes.
Bot: The prices of Product X at these stores is shown. Would you like to determine which stores have Product X in stock?
User: Yes.
Bot: The availability of Product X at these stores is shown. If you would you like directions to any one of these stores, click on the store.

The preceding "conversation" is representative of a basic interaction between the user, an instant messaging protocol and a browser protocol. It is understood that variations in the bot programming may be implemented to enable a variety of functional interactions between the user and the system of the invention that will lead to a multitude of results depending on a user's input.

During the conversation, the bot will continually interact with the browser to update the browser based on input received from the user's interaction with the instant messaging session. In addition, the bot will update the instant messaging side based on input received from the browser based on the user's interaction with the browser protocol.

In a further embodiment, the relative ranking of an advertiser as displayed at Box 112 may be determined by a bidding process in which the advertiser has the opportunity to improve the ranking of their brand, products or services through an offer to pay a higher fee relative to a competitor's brand, products or services. Such bidding may be conducted by an open or closed auction controlled and managed by the processing module 54. Alternatively, fixed fee amounts may be utilized to ensure prominence in association with specific keywords or keyword combinations.

The database 104 may be operatively linked to the vendors and manufacturer's web databases, thereby allowing a vendor to continually update stock and price information and a manufacturer to continually update their advertising information. The data links that are established to be able to do this may be through either RSS or XML feeds or other feeds that enable tightly coupled systems to talk to one another. In alternate embodiments vendor updates may be entered into database 104 via batch updates.

It is understood that the preceding description is representative of one general methodology of linking merchant and manufacturer information and that the actual displays and programming may be varied as would be understood by those skilled in the art. Moreover, the functionality described herein can be applied to almost all products and services that are commonly advertised using the Internet.

Thus, it is seen that a system, method and apparatus for interactive advertisement are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A computer implemented method, comprising:
   receiving, on a computing device, a user input from a user requesting information about a product within a proximity or a service within the proximity;
   in response to receiving the user input, displaying a first output in a first region of an instant messaging user interface on the computing device, the first output comprising a first list of at least one merchant within the proximity providing the product or the service;
   in response to receiving the user input, displaying a second output in a second region, distinct from the first region, of the instant messaging user interface on the computing device, the second output comprising a second list of at least one brand name under which the product or the service is available within the proximity, wherein the second output is displayed simultaneously with the first output;
   receiving a user interaction with the first output that selects an element from the first list or receiving a user interaction with the second output that selects an element from the second list;
   in response to the user interaction with the first output, updating both the first output and the second output based on the element selected from the first list; and
   in response to the user interaction with the second output, updating both the first output and the second output based on the element selected from the second list.

2. The computer implemented method of claim 1, wherein the instant messaging user interface comprises an interface embedded within a web browser.

3. The computer implemented method of claim 1, further comprising:
   initiating an instant messaging session, where:
      the user input comprises one or more instant messages; and
      the first output comprises an instant message provided in response to the user input within the instant messaging session; and further comprising:
   displaying a browser window displayed simultaneously with the instant messaging session, where the second output is included in the browser window.

4. The computer implemented method of claim 3, further comprising:
   interacting with the user by an Internet bot to elicit the user input.

5. The computer implemented method of claim 4, wherein the Internet bot comprises a control on the instant messaging user interface.

6. The computer implemented method of claim 1, further comprising:

formulating a search query based on the user input;
searching at least one database using the search query, the database comprising information about merchants providing the product or the service and information about advertisers; and
generating the first output and the second output based on the database search.

7. The computer implemented method of claim 1, wherein:
receiving the user interaction with the second output that selects an element from the second list comprises receiving a user interaction that selects a brand name included in the second list; and
updating the first output comprises:
   updating the first list to include at least one merchant in the proximity providing the product or the service under the selected brand name; and
   displaying additional information about the product or the service available under the selected brand name.

8. The computer implemented method of claim 7, wherein displaying the additional information about the product or the service available under the selected brand name comprises displaying a means for the user to request a list of at least one merchant in the proximity with the product or the service available under the selected brand name in stock.

9. The computer implemented method of claim 1, further comprising:
receiving a user input selecting a merchant included in the first list; and
in response to receiving the user input selecting the merchant:
   displaying additional information about the selected merchant; and
   displaying a graphical display of a location of the merchant within the proximity.

10. A system for displaying search results for a product within a proximity or a service within the proximity, the system comprising:
an instant messaging user interface configured to:
   receive a user input requesting information about the product or the service;
   in response to receiving the user input, simultaneously display a first output in a first region of the instant messaging user interface on a computing device and a second output in a second region, distinct from the first region, of the instant messaging user interface on the computing device, wherein:
      the first output comprises a first list of at least one merchant within the proximity providing the product or the service; and
      the second output comprises a second list of at least one brand name under which, within the proximity, the product or the service is available;
wherein the instant messaging user interface is further configured to:
   receive a user interaction with the first output that selects an element from the first list;
   receive a user interaction with the second output that selects an element from the second list
   in response to a user interaction with the first output, update both the first output and the second output based on the element selected from the first list; and
   in response to a user interaction with the second output, update both the first output and the second output based on the element selected from the second list; and further comprising:
a search engine configured to:
   formulate a search query based at least in part on the received user input;
   search a database using the search query; and
   generate the first list and the second list based on the database search;
wherein the database comprises:
   information about a plurality of merchants, comprising at least one respective geographic location associated with each merchant; and
   information about a plurality of brand names respectively associated with ones of a plurality of products and services.

11. The system of claim 10, wherein the instant messaging user interface comprises an interface embedded within a web browser.

12. The system of claim 10, wherein the instant messaging user interface is further configured to:
   initiate an instant messaging session, where the user input comprises an instant message and the first output comprises an instant message within the instant messaging session; and
   display a browser window comprising the second output.

13. The system of claim 10, further comprising:
an Internet bot configured to communicate with the user in the instant messaging session and provide information to the search engine.

14. The system of claim 13, wherein the Internet bot comprises a control on the instant messaging user interface.

15. The system of claim 10, where:
the instant messaging user interface is further configured to:
   receive a second user input; and
the search engine is further configured to:
   formulate a second search query based on the second user input;
   search the database using the second search query; and
   update the first list and update the second list based on the database search.

16. A computer implemented method comprising:
initiating an instant messaging session with an instant messaging user interface;
initiating an Internet bot configured to interact with a user of the instant messaging session;
receiving, on a computing device, within the instant messaging session, a user input comprising an instant message directed to the Internet bot, where the user input includes a request for information about a product within a proximity or a service within the proximity;
in response to the Internet bot receiving the user input, generating an instant message from the Internet bot, directed to the user, where the generated instant message includes information for displaying:
   a first output in a first region of the instant messaging user interface, the first output comprising a first list of at least one merchant within the proximity providing the product or the service; and
   displaying a second output in a second region, distinct from the first region, of the instant messaging user interface, the second output comprising a second list of at least one brand name under which, within the proximity, the requested product or the service is available, wherein: the second output is displayed simultaneously with the first output;
receiving a user interaction with the first output that selects an element from the first list or receiving a user interaction with the second output that selects an element from the second list;

in response to the user interaction with the first output, updating both the first output and the second output based on the element selected from the first list; and in response to a user interaction with the second output, updating both the first output and the second output based on the element selected from the second list.

17. The computer implemented method of claim 16, wherein the instant messaging user interface comprises an interface embedded within a web browser.

18. The computer implemented method of claim 16, further comprising:

receiving a second user input interacting with the first output or the second output; and displaying an updated at least one of the first output and the second output based on the second user input.

19. The computer implemented method of claim 18, wherein:

the second user input comprises a selection of a brand name included in the second output;

the updated first output comprises a list of at least one merchant in the proximity providing the selected brand name; and the updated second output comprises additional information about the product or the service available under the selected brand name.

20. The computer implemented method of claim 19, wherein:

the updated second output includes a prompt for the user to request a list of at least one merchant in the proximity having the product or the service available under the selected brand name in stock.

21. The computer implemented method of claim 18, wherein:

the second user input comprises a selection of a merchant included in the first output;

the updated first output comprises additional information about the selected merchant; and the updated second output comprises a graphical display of a location of the merchant within the proximity.

22. A computer implemented method, comprising:

receiving, on a computing device, a user input from a user requesting information about a product within a proximity or a service within the proximity;

in response to receiving the user input, displaying a first output in a first region of an instant messaging user interface on the computing device, the first output comprising a first list of at least one merchant within the proximity providing the product or the service;

in response to receiving the user input, displaying a second output in a second region, distinct from the first region, of the instant messaging user interface on the computing device, the second output comprising a second list of at least one brand name under which the product or the service is available within the proximity, wherein the second output is displayed simultaneously with the first output;

receiving a user interaction with the first output that selects an element from the first list;

in response to the user interaction with the first output, updating both the first output and the second output based on the element selected from the first list.

23. A computer implemented method, comprising:

receiving, on a computing device, a user input from a user requesting information about a product within a proximity or a service within the proximity;

in response to receiving the user input, displaying a first output in a first region of an instant messaging user interface on the computing device, the first output comprising a first list of at least one merchant within the proximity providing the product or the service;

in response to receiving the user input, displaying a second output in a second region, distinct from the first region, of the instant messaging user interface on the computing device, the second output comprising a second list of at least one brand name under which the product or the service is available within the proximity, wherein the second output is displayed simultaneously with the first output; and receiving a user interaction with the second output that selects an element from the second list;

in response to the user interaction with the second output, updating both the first output and the second output based on the element selected from the second list.

* * * * *